D. H. MERRITT.
Friction Gearing.
No. 196,817. Patented Nov. 6, 1877.
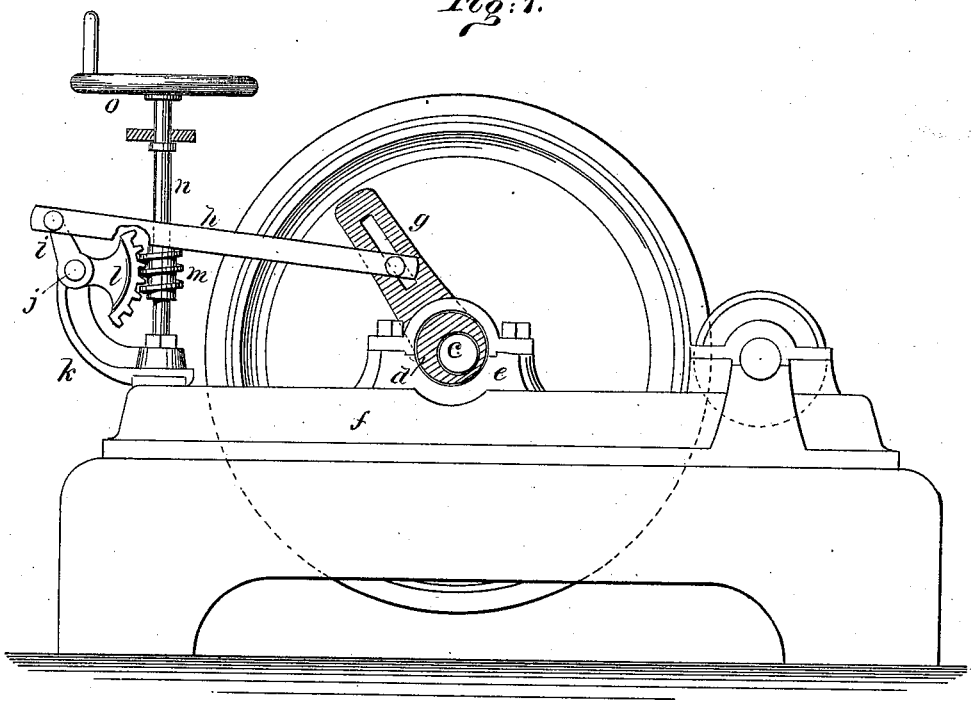
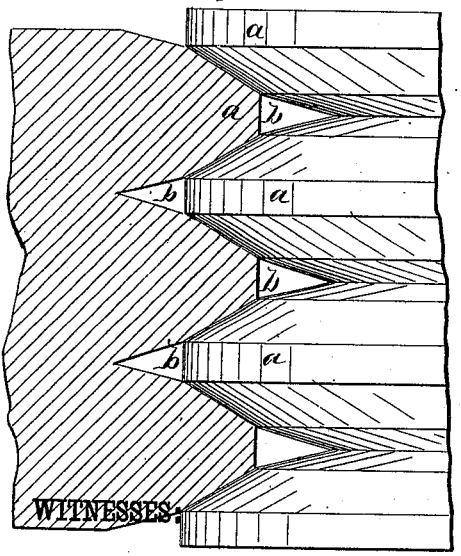
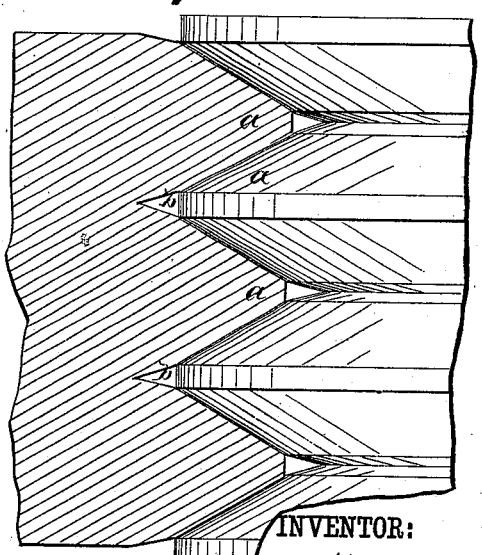

UNITED STATES PATENT OFFICE.

DANIEL H. MERRITT, OF MARQUETTE, MICHIGAN.

IMPROVEMENT IN FRICTION-GEARINGS.

Specification forming part of Letters Patent No. 196,817, dated November 6, 1877; application filed September 14, 1877.

*To all whom it may concern:*

Be it known that I, DANIEL H. MERRITT, of Marquette, in the county of Marquette and State of Michigan, have invented a new and Improved Friction-Gearing, of which the following is a specification:

Figure 1 represents a friction-wheel and pinion in gear with each other, constructed in accordance with my improvement. Fig. 2 is a partial plan view, partly in section, of my improved gearing. Fig. 3 is a partial plan view, partly in section, showing the appearance of the wheels after wear.

My improvement relates to friction wheels or gears having annular teeth or grooves extending around their peripheries, for communicating motion by bringing the grooved surfaces into contact under pressure.

Friction-gears as ordinarily made are objectionable, from the fact that when brought into contact the ends of the teeth travel faster than their bases, and the end of the teeth of one gear being in contact with the base of the other, a cutting friction results, causing unequal wear upon the teeth. If the teeth are made fully triangular in section their apexes will bottom, when they must be turned down before they can be further used. When the teeth or ribs are made trapezoidal in form, and there is a rectangular groove between the bases of the ribs which is equal in width to the peripheral surface of the ribs, the outer surface becomes worn, so that it accurately fits the rectangular groove between the ribs of the intermeshing wheel. When this occurs the lateral motion of the wheels, or the end motion of their shafts, breaks the rectangular portion produced by wear, and often breaks the ribs or teeth themselves. In addition to this objection, the friction-surfaces are constantly decreasing, and the machine loses its efficiency.

My improvement consists in making a triangular or V-shaped groove between the bases of the ribs or teeth, the angle being more acute than that of the ribs or teeth. The teeth or ribs travel faster at this periphery than at their bases. They are, consequently, liable to the greatest wear at the outer portion of their surface.

As the wear varies with gears of different proportions, the angle of the groove must be varied to conform to the speed of the peripheries, so that as the ribs wear away they will maintain their original form, but will be increased in size and efficiency as the wear progresses.

The form of the ribs or teeth, when newly made, is represented in Fig. 2.

Fig. 3 represents the ribs or teeth after wear, $a$ representing the ribs or teeth, and $b$ the angular grooves at the base of the teeth. To throw these wheels into and out of gear, and to compensate for wear, the shaft $c$ of one of the wheels is placed in eccentric-boxes $d$, which rotate in pillow-blocks $e$, one being on each side of the frame $f$, and are provided with slotted arms $g$, which are connected by rods $h$ with arms $i$ on the shaft $j$. This shaft is journaled in brackets $k$, attached to the frame $f$, and upon it a toothed sector, $l$, is placed, that is engaged by a worm, $m$, on the vertical shaft $n$. A hand-wheel, $o$, is placed upon the upper end of this shaft, for convenience in adjusting its gears.

By turning the shaft $n$ the toothed sector $e$ is moved by the worm $m$, carrying with it the shaft $j$ and arms $i$, the latter being connected with the arms $g$ by rods, as before described.

Having thus described my invention, I claim as new and desire to secure by Letters Patent—

A friction-wheel having ribs or teeth that are trapezoidal in transverse section, and have between their bases triangular grooves of a more acute angle than the teeth or ribs, substantially as shown and described.

DANIEL H. MERRITT.

Witnesses:
A. F. MAYNARD,
M. H. MAYNARD.